: US 10,346,332 B2
(45) Date of Patent: Jul. 9, 2019

(12) United States Patent
Tanabe

(54) SLAVE DEVICE

(71) Applicant: FANUC CORPORATION, Yamanashi (JP)

(72) Inventor: Masaki Tanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/725,479

(22) Filed: Oct. 5, 2017

(65) Prior Publication Data
US 2018/0101490 A1 Apr. 12, 2018

(30) Foreign Application Priority Data

Oct. 12, 2016 (JP) ................. 2016-201015

(51) Int. Cl.
G06F 11/30 (2006.01)
G06F 13/362 (2006.01)
G06F 13/38 (2006.01)
G06F 13/42 (2006.01)
G06F 9/445 (2018.01)

(52) U.S. Cl.
CPC ........ G06F 13/362 (2013.01); G06F 9/44505 (2013.01); G06F 11/3079 (2013.01); G06F 13/38 (2013.01); G06F 13/42 (2013.01)

(58) Field of Classification Search
CPC .......... G06F 13/14; G06F 13/20; G06F 13/22; G06F 13/362; G06F 13/378; G06F 13/38; G06F 13/42; G06F 9/44505; G06F 8/658; G06F 17/30345; G06F 17/30368; G06F 1/3253; G06F 11/3079
See application file for complete search history.

(56) References Cited

U.S. PATENT DOCUMENTS

| 4,167,730 A | * | 9/1979 | Brown | H04B 7/185 340/3.21 |
| 4,589,081 A | * | 5/1986 | Massa | G08B 23/00 340/501 |
| 5,274,838 A | * | 12/1993 | Childress | H04W 84/08 455/17 |
| 5,706,210 A | * | 1/1998 | Kumano | H04L 43/065 709/224 |
| 5,905,523 A | * | 5/1999 | Woodfield | A63F 13/12 463/40 |
| 6,006,148 A | * | 12/1999 | Strong | G07B 15/00 701/32.3 |

(Continued)

FOREIGN PATENT DOCUMENTS

JP    07-147582 A    6/1995

Primary Examiner — Thomas J Cleary
(74) Attorney, Agent, or Firm — Hauptman Ham, LLP

(57) ABSTRACT

When a data request is sent from a master device in master-slave communication, a slave device determines whether a piece of data requested by the data request among data stored on the slave device side has been updated after previous transmission of the piece of data. If the piece of data has been updated, the slave device sends the updated piece of data as a response to the data request. If the piece of data has not been updated, the slave device suspends a response to the data request. Thus, a communication system is built which can reduce network processing load and the volume of communication data in the case where the master device periodically acquires data from the slave device.

5 Claims, 5 Drawing Sheets

(56) References Cited

U.S. PATENT DOCUMENTS

| | | | |
|---|---|---|---|
| 8,260,872 B1 * | 9/2012 | Smaidris | G05B 19/042 709/208 |
| 2007/0058556 A1 * | 3/2007 | Hilla | H04L 41/0893 370/252 |
| 2017/0092114 A1 * | 3/2017 | Barrieau | G08B 17/06 |

* cited by examiner

SLAVE DEVICE

RELATED APPLICATIONS

The present application claims priority to Japanese Application Number 2016-201015 filed Oct. 12, 2016, the disclosure of which is hereby incorporated by reference herein in its entirety.

BACKGROUND OF THE INVENTION

1. Field of the Invention

The present invention relates to a slave device, and particularly relates to a slave device which determines information transmission timing in master-slave communication.

2. Description of the Related Art

With the popularization of the Internet of Things (IoT) technology, collecting sensor-acquired information and internal information through networks has increasingly become active. In networks in factories, a method has generally been widely used in which a master device (CNC or PC) periodically requests slave devices (such as sensors) to read out data to collect data.

Most standards for master-slave communication performed between a master device and a slave device generally support both of read and write operation by the master device with respect to the slave device. In actual operation, however, some devices (such as IO devices) perform both read and write operations, but there are many cases where a slave device (such as a sensor or a counter) assumes that a master device performs one-way data read operations, or where a master device sends only data read-out requests for data collection (such as an operation management system).

In such master-slave communication, in the case where a master device periodically collects data from a slave device, the maximum value of the time (information transmission time) elapsed after a change occurring in data possessed by the slave device before the master device knowing the change depends on the time interval (polling interval) at which the master device sends a data request to the slave device, as shown in FIG. 4. Accordingly to reduce the information transmission time, the master device needs to shorten the time interval of data requests to be sent to the slave device.

As a prior art technique relating to master-slave communication, for example, Japanese Patent Application Laid-Open No. 07-147582 discloses the following technique: a slave device internally has a flag for indicating that data has changed; the slave device normally sends only the flag as a response; and, if the response contains a flag indicating a change in data, a master device additionally requests the details thereof, thus reducing the volume of communication under normal conditions.

In master-slave communication, a possible way to make a master device quickly respond to a change in data in a slave device is, for example, to reduce the above-described maximum value of the information transmission time by shortening the time interval (polling interval) at which the master device sends a data request to the slave device as shown in FIG. 5. However, in such a case, the frequencies of requests and responses sent between the master device and the slave device increase, and this increases the volume of communication flowing on the communication channel. This means that even when data have not changed in the slave device, the same large volume of data flow on the communication channel. As a result, both of the master device and the slave device cause increases in the CPU load and the network load of the entire system.

In the aforementioned prior art technique disclosed in Japanese Patent Application Laid-Open No. 07-147582, data are normally transferred using only a flag, and, only if the flag has been changed, actual data are transferred, thus reducing the number of data transfers and the volume of communication. However, as the frequency of data updates increases, both of the flag and data are frequently transmitted, and the volume of communication becomes larger than that in prior art transfer by an amount corresponding to flag transmission. Thus, the above-described problems cannot be sufficiently dealt with.

SUMMARY OF THE INVENTION

Accordingly, an object of the present invention is to provide a slave device which can reduce network processing load and the volume of communication data in master-slave communication in the case where a master device periodically acquires data from the slave device.

In the present invention, a slave device controls the timing for sending a response to a data read-out request from a master device in accordance with the state of data possessed by the slave device itself, thus solving the above-described problems. In the present invention, the slave device is configured to be capable of determining whether the current data have been changed after the previous data transmission from the slave device to the master device. Further, when a data read-out request is sent from the master device to the slave device, the slave device sends a response only if data have been changed or if a suspension time set in advance has elapsed.

A slave device according to the present invention performs master-slave communication with a master device and, in response to a data request sent from the master device, sends data requested by the data request as a response. The slave device includes: a data section for storing data; a functional operating section for updating data stored in the data section; a data update management section for managing an update of data stored in the data section; and a command analysis section for, when a data request is sent from the master device, determining whether a piece of data requested by the data request among data stored in the data section has been updated after previous transmission of the piece of data, sending the updated piece of data as a response to the data request if it is determined that the piece of data has been updated after the previous transmission, and suspending a response to the data request if it is determined that the piece of data has not been updated after the previous transmission.

The data update management section may be configured to store a data update flag which is turned ON when data stored in the data section is updated, and the command analysis section may be configured to, if the data update flag corresponding to a piece of data stored in the data section is ON, determine that the piece of data has been updated after the previous transmission.

The data update management section may be configured to store, as sent data, a data value which a piece of data stored in the data section has had at the previous transmission, and the command analysis section may be configured to, if a piece of data stored in the data section is different from sent data corresponding to the piece of data, determine that the piece of data has been updated after the previous transmission.

The command analysis section may be configured to determine whether a piece of data requested by the data request among data stored in the data section has been updated after the previous transmission of the piece of data, in accordance with operation mode.

The command analysis section may be configured to determine, based on a timeout period between the master device and the slave device, a period of time during which a response to the data request is suspended.

According to the present invention, in master-slave communication in the case where the frequency of data changes in a slave device is low, the network load and the CPU load can be reduced. Moreover, since the network load and the CPU load are reduced, the polling interval of the master can be shortened compared to those in prior art techniques, and information transmission time can be shortened. Further, the present invention is a technique in which the operation of a slave device in a prior art communication system is improved, and a master device compatible with prior art specifications can be used without changes.

DETAILED DESCRIPTION OF THE PREFERRED EMBODIMENTS

The present invention assumes cases where in master-slave communication performed between a master device and a slave device in a communication system, the master device periodically sends a data request to the slave device. Examples of such cases are the following: the case where the master device is a controller, and a slave device is a sensor for measuring the temperature of a workpiece; and the case where the master device is an operation management server intended only to collect information.

Moreover the present invention basically assumes that Modbus/TCP is used as a communication protocol used in communication between a master device and a slave device. Embodiments below will also be described on the assumption that a master device and a slave device communicate using Modbus/TCP. However, any protocol in which in communication between a master device and each slave device, the order of communications between the master device and the slave device is not fixed can be used in the present invention. The communication protocol used in the present invention is not limited to a specific protocol.

Figure 1:
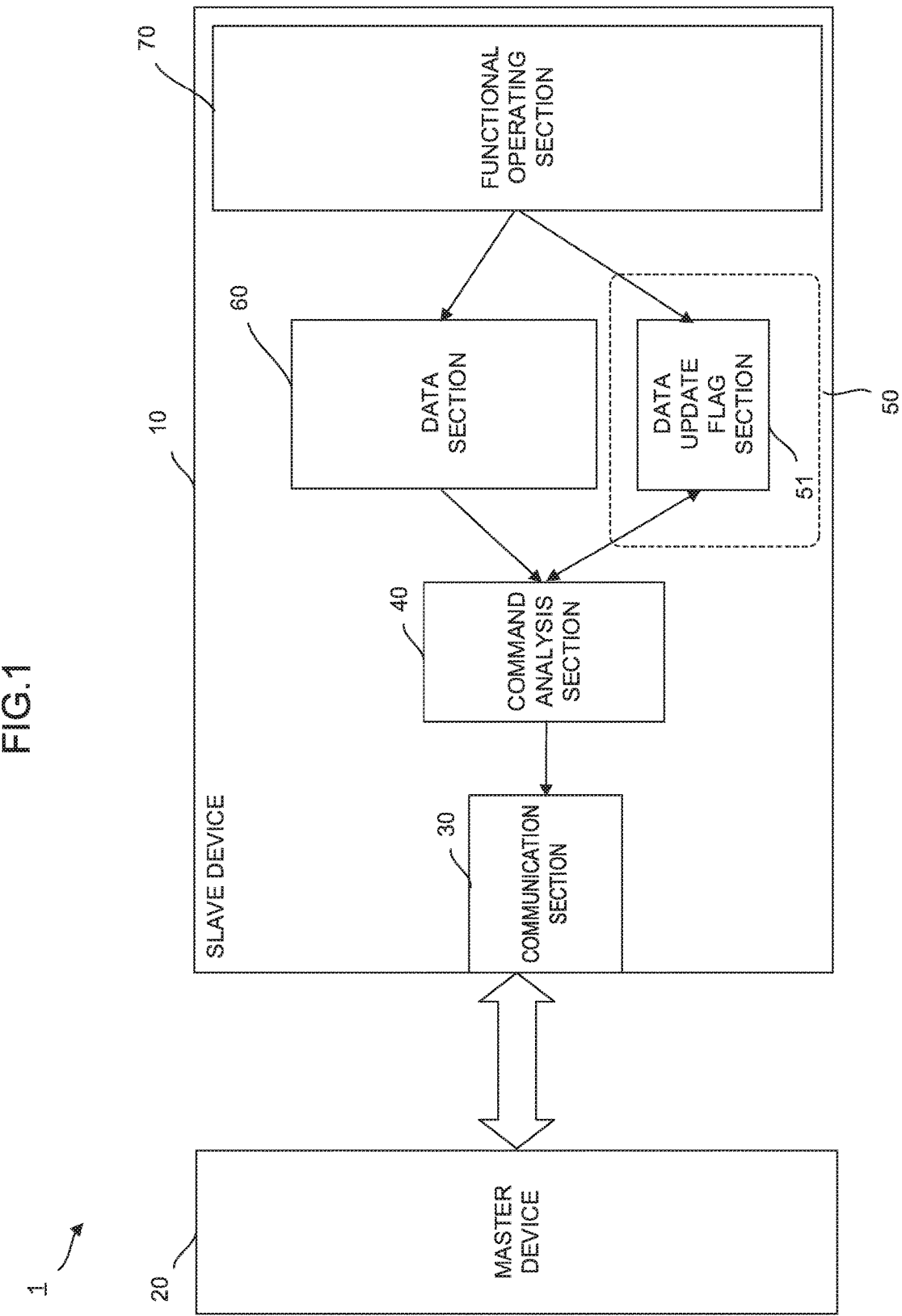
FIG. 1 is a functional block diagram schematically showing a communication system including a slave device according to a first embodiment of the present invention.
Figure 2:
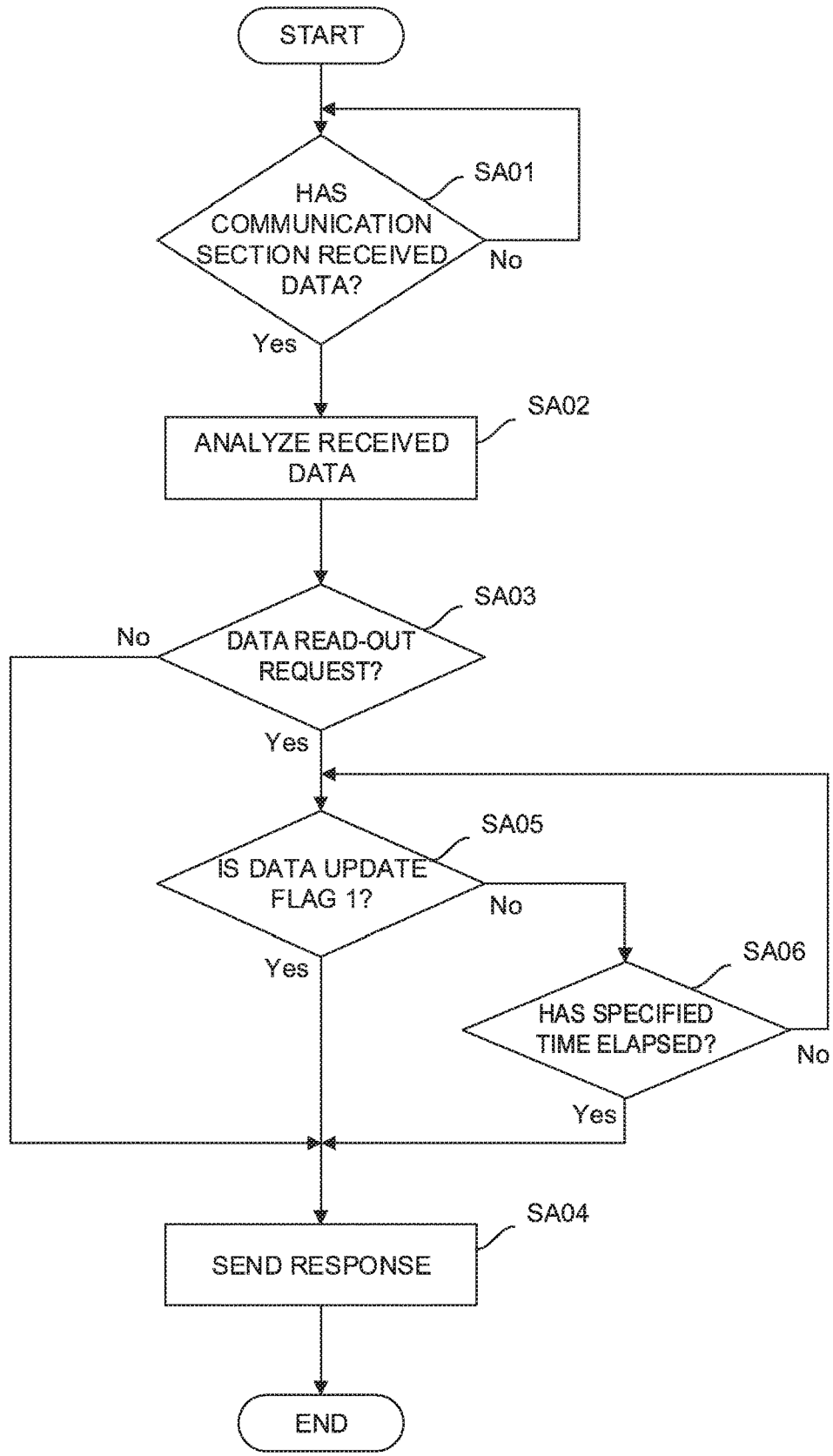
FIG. 2 is a flowchart schematically showing a process executed on the slave device in FIG. 1.

FIG. 1 is a functional block diagram schematically showing a communication system including a slave device according to a first embodiment of the present invention. FIG. 2 is a flowchart schematically showing a process executed on the slave device in FIG. 1. A communication system 1 of the present embodiment is configured such that at least one slave device 10 is connected to a master device 20 in a wired or wireless manner so that communication can be performed therebetween.

The slave device 10 includes a communication section 30, a command analysis section 40, a data section 60, a data update management section 50, and a functional operating section 70. The communication section 30 receives information from the master device 20. The command analysis section 40 analyzes a command sent from the master device 20 and generates a response. The data section 60 stores data which are read out in accordance with the command analyzed by the command analysis section 40. The data update management section 50 uses a data update flag section 51 in the present embodiment. The data update flag section 51 stores at least one data update flag. The functional operating section 70 is provided to enable the slave device 10 to operate as a device.

The data update flag section 51 stores at least one data update flag corresponding to data stored in the data section 60. A data update flag may be used for each piece of data in the data section 60, or may be used for each group of pieces of data or all pieces of data in the data section 60. Each data update flag stored in the data update flag section 51 is initialized to one (ON) when the slave device 10 is started.

The functional operating section 70 performs various operations as functions of the slave device 10, such as sensor functions, counter functions, and machining functions, depending on the type of the device. The functional operating section 70 stores a result of operation and operation status in the data section 60. At that time, in the case where a value different from a value stored the previous time is stored, the data update flag corresponding to data stored in the data section 60, among the data update flags stored in the data update flag section 51, is set to one (ON).

In the slave device 10, when the communication section 30 receives a request from the master device 20 (step SA01), the command analysis section 40 analyzes the content of the request (step SA02). If the command analyzed by the command analysis section 40 is a command other than a data read-out request (step SA03; the result of determination is No), the command analysis section 40 responds in the same manner as a prior art slave device to send a response to the master device 20 (step SA04).

On the other hand, if the command analyzed by the command analysis section 40 is a data read-out request (step SA03; the result of determination is Yes), the command analysis section 40 refers to the data update flag section 51 and checks the data update flag corresponding to data to be read out. If the data update flag is one (ON), that is, if the data to be read out has been updated after the previous read-out operation (step SA05; the result of determination is Yes), the command analysis section 40 reads the relevant data from the data section 60, sends a response to the master device 20, and sets the data update flag corresponding to the sent data to zero (OFF) (step SA04). On the other hand, if the data update flag is zero (OFF), that is, if the data to be read out has not been updated after the previous read-out operation (step SA05; the result of determination is No), the command analysis section 40 suspends the transmission of a response to the master device 20.

In the case where the command analysis section 40 suspends the transmission of a response to the master device 20, the command analysis section 40 monitors the data update flag corresponding to the data to be read out, among the data update flags stored in the data update flag section 51. When the data update flag is updated to one (ON) by the functional operating section 70, the command analysis section 40 reads the relevant data from the data section 60, sends the read data as a response to the master device 20, and sets the data update flag corresponding to the sent data to zero (OFF) (step SA04). Moreover, if the functional operating section 70 has not updated the data update flag for not less than a predetermined suspension time set in advance while the transmission of a response to the master device 20 is being suspended, in other words, if data have not been updated for not less than the suspension time (step SA06; the result of determination is Yes), the command analysis section 40 sends unupdated data (same data as the previous data) as a response to the master device 20 (step SA04) to prevent an error from occurring in the master device 20 due to timeout.

It should be noted that the suspension time may be set by an administrator of the functional operating section 70 or the slave device 10.

As described above, in the first embodiment, since data update flags are managed in the data update management section, a response is suspended if data have not been changed after the previous data transmission to the master device. Accordingly, the network load and the CPU load can be reduced in the case where the frequency of data changes between the master and the slave is low.

Figure 3:
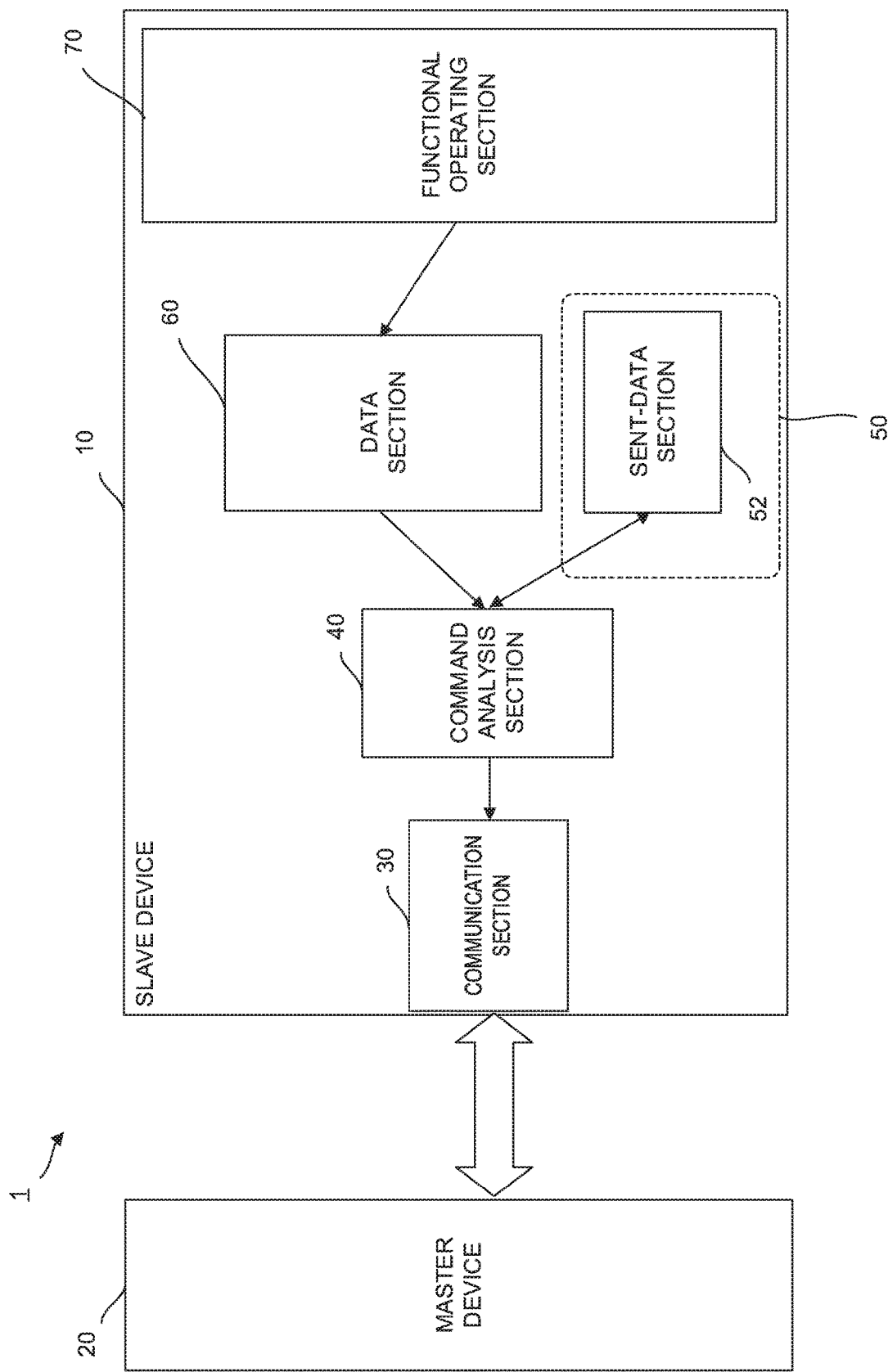
FIG. 3 is a functional block diagram schematically showing a communication system including a slave device according to a second embodiment of the present invention.
Figure 4:
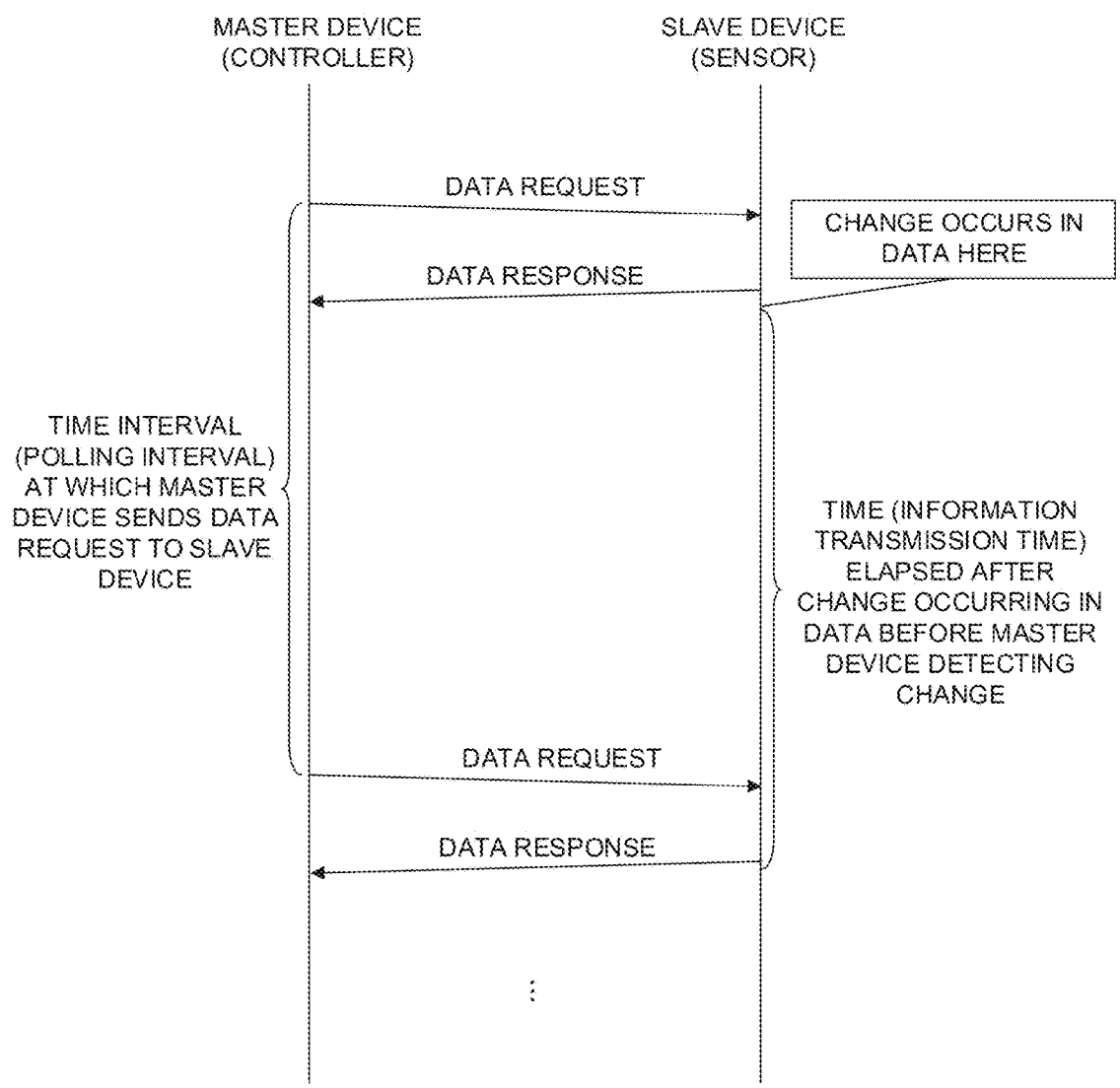
FIG. 4 is a view for explaining master-slave communication in a prior art technique.
Figure 5:
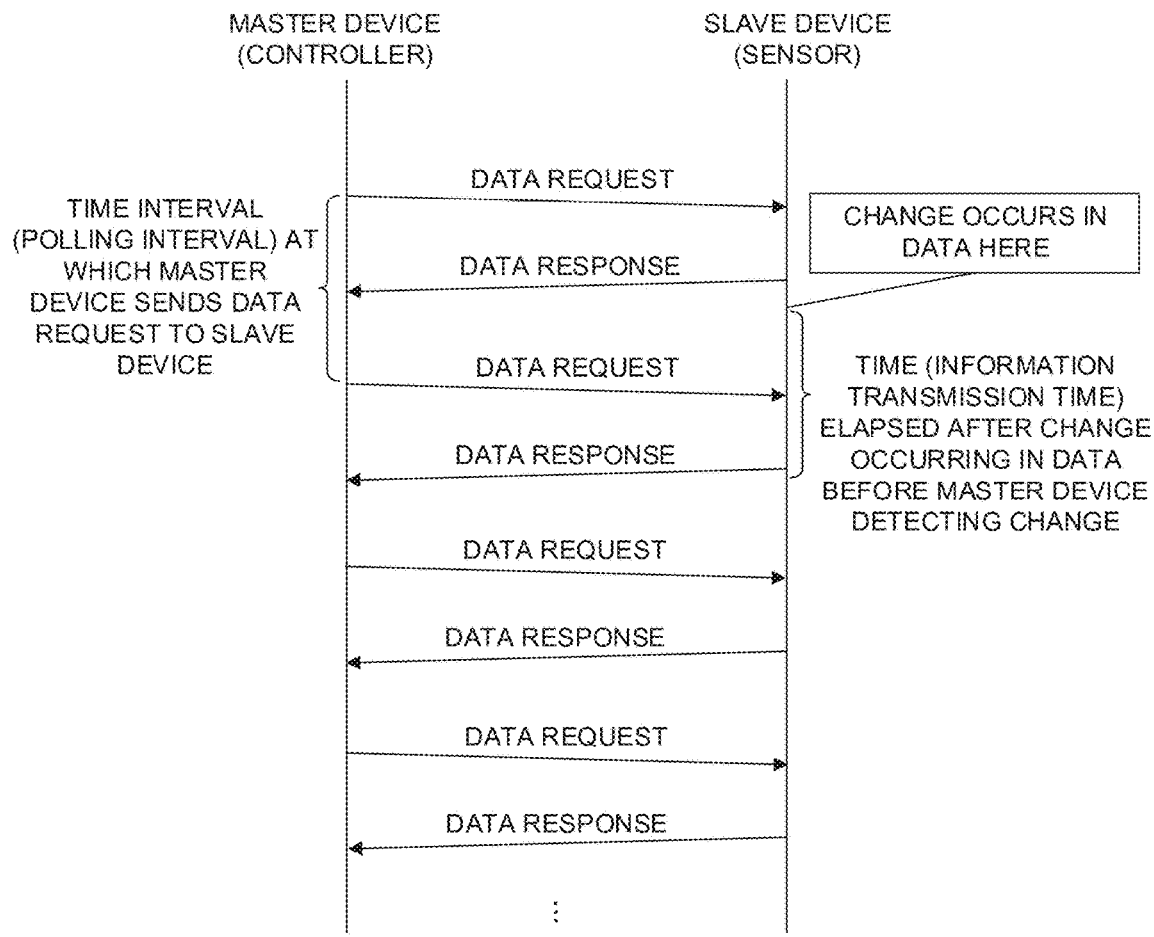
FIG. 5 is a view for explaining a problem of prior art techniques.

FIG. 3 is a functional block diagram schematically showing a communication system including a slave device according to a second embodiment of the present invention.

While the slave device 10 of the above-described first embodiment uses the data update flag section 51 as the data update management section 50, the slave device 10 of the second embodiment uses a sent-data section 52 as the data update management section 50.

The sent-data section 52 stores sent data, which are data sent as a response to the previous read-out request from the master device 20. The sent-data section 52 stores sent data for each piece of data which can be requested to be read out by the master device 20. The sent data stored in the sent-data section 52 are initialized to data (for example, an unlikely data value of the relevant data under normal conditions) which represent data that has not been sent, when the slave device 10 is started.

In the communication system 1 of the present embodiment, when data is changed, the functional operating section 70 manipulates only the data in the data section 60 but does not manipulate the sent data in the sent-data section 52. When receiving a data read-out request from the master device 20, the command analysis section 40 compares data in the data section 60 and sent data in the sent-data section 52 corresponding to the relevant data. If there is a difference between these pieces of data, the command analysis section 40 sends data to be read out, which is stored in the data section 60, as a response to the master device 20, and updates the sent data in the sent-data section 52 with the data sent as a response. On the other hand, if comparison between the data in the data section 60 and the sent data in the sent-data section 52 corresponding to the relevant data shows no difference between these pieces of data, the command analysis section 40 suspends an answer to the master device 20 as in the first embodiment, and monitors a change in the data to be read out from the data section 60. Further, if data have been changed within the suspension time, the command analysis section 40 sends the changed data in the data section 60 as a response to the master device 20, and updates the sent data in the sent-data section 52 with the data sent as a response. If data have not been changed within the suspension time, the command analysis section 40 sends the unchanged data in the data section 60 as a response to the master device 20 to prevent a timeout error.

As described above, in the second embodiment, by managing sent data in the data update management section 50 (sent-data section 52), a response is suspended if data have not been changed after the previous data transmission to the master device. Accordingly, the network load and the CPU load can be reduced in the case where the frequency of data changes between the master and the slave is low.

While the embodiments of the present invention have been described above, the present invention is not limited to the above-described exemplary embodiments, but can be carried out in various aspects by making appropriate modifications thereto.

For example, the slave devices described in the above-described embodiments assume that the above-described communication method is always enabled. However, the above-described communication method may be used as a mode rather than being always enabled. The above-described communication method may be dynamically switched from the behavior of the prior art slave device, and vice versa.

Such mode switching may be performed by a command from the master device 20. In such a case, communication specifications may be extended to prepare a dedicated command for a mode switching trigger, or the mode may be switched by writing a specific value to a specific piece of data in the data section 60 using a command.

The mode may be switched based on a determination made as to the status of operation by the slave device 10. For example, the functional operating section 70 of the slave device 10 may monitor the CPU load thereof and, if the CPU load reaches a predetermined level, may instruct the command analysis section 40 to change the mode.

Moreover, in the case where a command other than data read-out, such as a request to write initial settings from the master device 20, is requested at the time of power-on or at the time of participating in a network, the functional operating section 70 of the slave device 10 may determine whether the processing of such commands other than data read-out has been finished or not, and may instruct the command analysis section 40 to change the mode. On the other hand, when a steady state ends, for example, when an error occurs in the functional operating section 70, the mode may be changed from the communication method introduced by the present invention to the behavior of the prior art slave device 10. At that time, if the command analysis section 40 has a command suspended, the command analysis section 40 immediately sends a response to the master device 20, and changes the mode after the response has been sent.

In the above-described first and second embodiments, the suspension time is set in advance. However, the command analysis section 40 may allow a command suspension time to be specified in a way other than a setting provided by an administrator of the functional operating section 70 or the slave device 10. For example, after connected to the master device 20 through a network, the slave device 10 keeps from sending a response in response to a first command request from the master device 20 for not less than a specified period of time. In this case, since the command request times out on the master device 20 side, the master device 20 disconnects a communication channel to the slave device 10 due to the occurrence of an error or tries to reconnect to the slave device 10. The slave device 10 may assume that the time elapsed after the receipt of the command request before the master device 20 trying to disconnect the communication channel or perform reconnection is a timeout period of the master device 20, and may set, as a suspension time, a time obtained by multiplying the timeout period by a fixed multiplying factor (for example, 0.8).

What is claimed is:

1. A slave device for performing master-slave communication with a master device and, in response to a data request sent from the master device, sending data requested by the data request as a response, the slave device comprising:
   a data section for storing data;
   a functional operating section for updating data stored in the data section;
   a data update management section for managing an update of data stored in the data section; and
   a command analysis section for, in response to a data request sent from the master device,
      determining whether a piece of data requested by the data request among data stored in the data section has been updated after previous transmission of the piece of data,
      sending the updated piece of data as a response to the data request if it is determined that the piece of data have been updated after the previous transmission, and
      suspending a response to the data request if it is determined that the piece of data has not been updated after the previous transmission, wherein
         while the command analysis section suspends the response to the data request, the command analysis section is configured to monitor whether the data stored in the data section is updated,
         in response to the data stored in the data section being updated within a predetermined period of time after the data request is sent from the master device, the command analysis section is configured to read the updated data stored in the data section and send, as the response to the data request, the updated data to the master device, and
         in response to the data stored in the data section not being updated within the predetermined period of time after the data request is sent from the master device, the command analysis section is configured to send, as the response to the data request, the unupdated data stored in the data section to the master device.

2. The slave device according to claim 1, wherein
the data update management section is configured to store a data update flag which is turned ON when the data stored in the data section is updated, and
in response to the data update flag corresponding to a piece of data stored in the data section being ON, the command analysis section is configured to determine that the piece of data has been updated after the previous transmission.

3. The slave device according to claim 1, wherein
the data update management section is configured to store, as sent data, a data value which a piece of data stored in the data section has had at the previous transmission, and
in response to a piece of data stored in the data section being different from the sent data corresponding to the piece of data, the command analysis section is configured to determine that the piece of data has been updated after the previous transmission.

4. The slave device according to claim 1, wherein the command analysis section is configured to determine whether a piece of data requested by the data request among data stored in the data section has been updated after the previous transmission of the piece of data, in accordance with operation mode.

5. The slave device according to claim 1, wherein the command analysis section is configured to determine, based on a timeout period between the master device and the slave device, a period of time during which a response to the data request is suspended.

* * * * *